May 2, 1944.   F. B. CHESSER   2,348,057
SNUFF DIPPER
Filed April 27, 1942
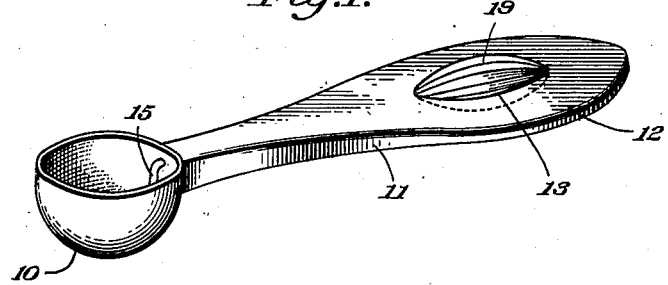
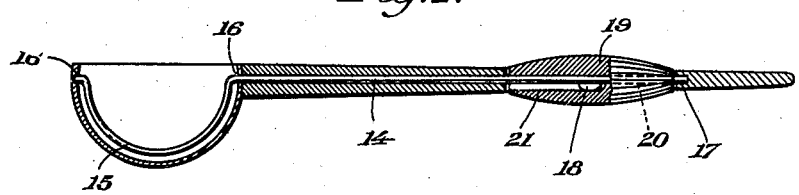
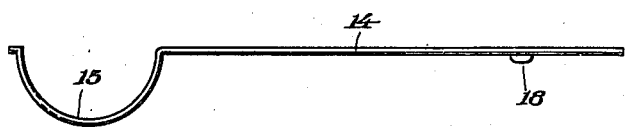
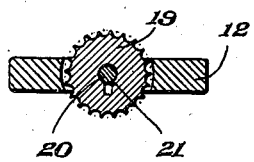
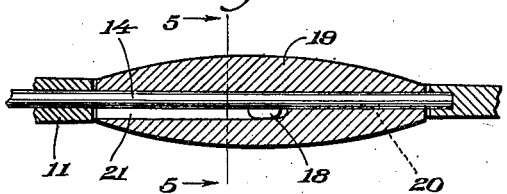
Fred B. Chesser:
INVENTOR
BY *Victor J. Evans & Co.*
ATTORNEYS Patented May 2, 1944

2,348,057

UNITED STATES PATENT OFFICE 2,348,057

SNUFF DIPPER

Fred B. Chesser, Bessemer, Ala.

Application April 27, 1942, Serial No. 440,719

2 Claims. (Cl. 30—128)

This invention relates to a snuff dipper and has for an object to provide a simplified device for enabling the user to dip snuff in a dignified way.

A further object is to provide a device of this character which may be used without danger of cutting of the gums and lips due to using a can, lid or knife blade as a snuff dipper, and which will also eliminate the spilling of snuff on the clothes.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a perspective view of a snuff dipper constructed in accordance with the invention.

Figure 2 is a longitudinal sectional view of the snuff dipper shown in Figure 1.

Figure 3 is a side elevation of the shaft and scraper of the snuff dipper.

Figure 4 is a detail longitudinal sectional view, drawn to large scale, showing the keyed end of the shaft and knurled knob for turning the shaft.

Figure 5 is a cross sectional view taken on the line 5—5 of Figure 4.

Referring now to the drawing in which like characters of reference designate similar parts in the various views, the snuff dipper comprises a hemispherical bowl portion 10 and a hollow handle portion 11 secured to the upper edge of the bowl portion. The handle portion is provided with a wide grip end 12 remote from the bowl portion and the grip portion is provided with an elongated aperture 13.

A shaft 14 is rotatably mounted in the hollow handle portion, see Figure 2, and the outer end of the shaft is bent to semi-circular form and lies within the bowl portion to form a scraper 15 for removing snuff from the bowl. The shaft is journalled in spaced openings 16 in the bowl. The outer end of the shaft enters a recess 17 formed at the rear end of the aperture in the wide grip portion 12 of the handle portion. The shaft is provided with a key 18.

An elongated knurled knob 19 is provided with an axial opening 20 to receive that portion of the shaft located within the elongated aperture 13. The key 18 of the shaft is engaged in a slot 21 formed in the axial opening 20.

The device may be operated by closing the fingers upon the wide grip portion 12 of the handle portion 11, in which position of the fingers the knob 19 is located so as to be readily rotated by the fingers while the grip is maintained on the handle portion. Rotation of the knob actuates the shaft 14 to swing the scraper 15 to remove snuff effectively from the bowl.

From the above description it is thought that the construction and operation of the invention will be fully understood without further explanation.

What is claimed is:

1. A snuff dipper comprising a bowl, an elongated handle secured to the upper side portion of the bowl and extending radially therefrom, the said handle having a longitudinally elongated aperture in its outer portion and an opening extending rearwardly from the aperture, that portion of the handle between the bowl and the aperture being hollow, a shaft extending through the hollow portion of the handle and the aperture with its outer end projecting into the opening in the outer portion of the handle, the inner end of the shaft having a curved portion disposed within the bowl to provide a scraper therefor, a longitudinally elongated knob mounted within the aperture of the handle and having an opening longitudinally therethrough receiving that portion of the shaft extending through the aperture, the said knob having a slot communicating with the longitudinal opening, and a key fixed on and projecting radially from the shaft and into the slot of the knob.

2. A snuff dipper comprising a bowl, an elongated handle secured to the upper side portion of the bowl and extending radially therefrom, the said handle having a longitudinally elongated aperture in its outer portion and an opening extending rearwardly from the aperture, that portion of the handle between the bowl and the aperture being hollow, a shaft extended through the hollow portion of the handle and the aperture with its outer end projecting into the opening in the outer portion of the handle, the inner end of the shaft having a curved portion disposed within the bowl to provide a scraper therefor, a longitudinally elongated tapered knob mounted within the aperture of the handle, the said knob having a longitudinal opening therethrough receiving that portion of the shaft extending through the aperture and provided with a slot communicating with the opening extending from the inner end of the knob to its medial portion, and a key fixed to and projecting radially from the shaft and into the slot in the knob.

FRED B. CHESSER.